United States Patent
Sanstrom et al.

(10) Patent No.: US 10,353,111 B2
(45) Date of Patent: Jul. 16, 2019

(54) AUTOMATED LEG QUALITY MONITORING SYSTEMS AND METHODS

(75) Inventors: William C. Sanstrom, Cypress, TX (US); Roland E. Chemali, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 753 days.

(21) Appl. No.: 12/740,262

(22) PCT Filed: Aug. 21, 2008

(86) PCT No.: PCT/US2008/073792
§ 371 (c)(1),
(2), (4) Date: Apr. 28, 2010

(87) PCT Pub. No.: WO2010/021622
PCT Pub. Date: Feb. 25, 2010

(65) Prior Publication Data
US 2010/0312477 A1     Dec. 9, 2010

(51) Int. Cl.
*G01V 11/00* (2006.01)

(52) U.S. Cl.
CPC .................. *G01V 11/00* (2013.01)

(58) Field of Classification Search
CPC . G01V 3/101; G01V 3/18; G01V 7/10; G01V 11/00; G01V 1/50; G01V 3/38; G01V 1/34; G01R 27/26
(Continued)

(56) References Cited

U.S. PATENT DOCUMENTS 4,319,192 A     3/1982   Chemali et al.
4,545,242 A *  10/1985   Chan ......................... 73/152.01
(Continued)

FOREIGN PATENT DOCUMENTS

AU     2008360702     6/2012
GB         2468224     7/2012
(Continued)

OTHER PUBLICATIONS

Crain, E.R., Crain's Petrophyscial Handbook, no date, pp. 1-16.*
(Continued)

*Primary Examiner* — Mischita L Henson
(74) *Attorney, Agent, or Firm* — Jason Sedano; C. Turney Law Group PLLC (57) ABSTRACT

Disclosed systems and methods provide automated log quality monitoring, thereby enabling fast, on-site determination of log quality by logging engineers as well as re-assurance to interpreters faced with geologically-improbable features in the logs. Such uses can provide early detection of logging issues, increase confidence in acquired logs, reduce unnecessary duplication of effort, and improve the reputation of the logging company. In at least some embodiments, log monitoring software applies a comparison function to axially-spaced (and/or azimuthally-spaced) sensors. The comparison function can be, inter alia, cross-correlation, mutual information, mean-square error, and ratio image uniformity, each of which can be determined as a function of a sliding window position to indicate regions wherein the log quality falls below a threshold value. It is not necessary for the log sensors to be of the same type, e.g., resistivity image sensors.

10 Claims, 4 Drawing Sheets

(58) Field of Classification Search
USPC .............................................. 702/6–7, 9–11
See application file for complete search history.

(56) References Cited

U.S. PATENT DOCUMENTS

| | | | |
|---|---|---|---|
| 4,567,759 A * | 2/1986 | Ekstrom | E21B 47/00 |
| | | | 324/355 |
| 4,646,026 A | 2/1987 | Chemali et al. | |
| 4,852,005 A | 7/1989 | Hepp et al. | |
| 4,918,669 A | 4/1990 | Chemali et al. | |
| 5,038,107 A | 8/1991 | Gianzero et al. | |
| 5,339,037 A * | 8/1994 | Bonner | G01V 3/20 |
| | | | 324/366 |
| 5,432,446 A | 7/1995 | MacInnis et al. | |
| 5,565,624 A * | 10/1996 | Deboaisne et al. | 73/152.02 |
| 5,581,024 A | 12/1996 | Meyer et al. | |
| 6,064,210 A * | 5/2000 | Sinclair | G01V 3/20 |
| | | | 324/338 |
| 6,072,314 A | 6/2000 | Oraby | |
| 6,173,793 B1 * | 1/2001 | Thompson | E21B 47/01 |
| | | | 175/24 |
| 6,373,970 B1 | 4/2002 | Dong | |
| 6,377,050 B1 | 4/2002 | Chemali et al. | |
| 6,405,136 B1 * | 6/2002 | Li et al. | 702/10 |
| 6,564,883 B2 | 5/2003 | Fredericks et al. | |
| 6,600,321 B2 | 7/2003 | Evans | |
| 6,678,616 B1 | 1/2004 | Winkler et al. | |
| 6,850,068 B2 | 2/2005 | Chemali et al. | |
| 6,868,036 B2 | 3/2005 | Wang et al. | |
| 6,909,666 B2 | 6/2005 | Dubinsky et al. | |
| 6,957,700 B2 | 10/2005 | Mandal | |
| 6,957,708 B2 | 10/2005 | Chemali et al. | |
| 7,063,174 B2 | 6/2006 | Chemali et al. | |
| 7,098,664 B2 | 8/2006 | Bittar et al. | |
| 7,099,810 B2 | 8/2006 | Mandal | |
| 7,114,565 B2 | 10/2006 | Estes et al. | |
| 7,272,504 B2 | 9/2007 | Akimov et al. | |
| 7,375,530 B2 | 5/2008 | Chemali et al. | |
| 7,400,262 B2 | 7/2008 | Chemali et al. | |
| 7,405,563 B2 | 7/2008 | Kruspe et al. | |
| 7,483,793 B2 | 1/2009 | Wang et al. | |
| 7,723,991 B2 | 5/2010 | Signorelli et al. | |
| 7,839,149 B2 | 11/2010 | Wang et al. | |
| 7,894,990 B2 | 2/2011 | Wang et al. | |
| 7,915,895 B2 | 3/2011 | Chemali et al. | |
| 7,973,532 B2 | 7/2011 | Forgang et al. | |
| 7,994,790 B2 | 8/2011 | Itskovich et al. | |
| 8,008,919 B2 | 8/2011 | Wang et al. | |
| 8,134,476 B2 | 3/2012 | Chemali et al. | |
| 8,164,339 B2 | 4/2012 | Fang et al. | |
| 8,332,152 B2 | 12/2012 | Itskovich et al. | |
| 9,697,620 B2 * | 7/2017 | Elkington | G06T 11/00 |
| 2002/0062992 A1 * | 5/2002 | Fredericks | E21B 47/00 |
| | | | 175/40 |
| 2003/0038634 A1 | 2/2003 | Strack | |
| 2005/0006090 A1 | 1/2005 | Chemali et al. | |
| 2005/0078555 A1 | 4/2005 | Tang et al. | |
| 2006/0015257 A1 * | 1/2006 | Hassan et al. | 702/6 |
| 2006/0198242 A1 | 9/2006 | Geerits et al. | |
| 2009/0177404 A1 * | 7/2009 | Hartmann | E21B 47/00 |
| | | | 702/9 |
| 2010/0020638 A1 | 1/2010 | Mickael et al. | |
| 2010/0312477 A1 | 12/2010 | Sanstrom et al. | |
| 2011/0204217 A1 | 8/2011 | Oraby et al. | |
| 2011/0284314 A1 | 11/2011 | Oraby | |
| 2012/0169841 A1 | 7/2012 | Chemali et al. | |

FOREIGN PATENT DOCUMENTS

| | | |
|---|---|---|
| WO | WO-2010/021622 | 2/2010 |
| WO | WO-2012/039707 | 3/2012 |

OTHER PUBLICATIONS

PCT International Search Report and Written Opinion, dated Feb. 25, 2010, Appl No. PCT/US08/73792, "Automated Log Quality Monitoring Systems and Methods", filed Aug. 21, 2008, 9 pgs.

Brown, Lisa Gottesfeld "A Survey of Image Registration Techniques", ACM Computing Surveys, vol. 24, No. 4, (Dec. 1992), 52 pgs.

Prammer, Manfred G., et al., "Field Testing of an Advanced LWD Imaging/Resistivity Tool", SPWLA 48th Annual Logging Symposium, (Jun. 3, 2007), pp. 1-15.

Wikipedia, "Cross-Correlation", http://en.wikipedia.org/wiki/Cross-correlation, (Oct. 19, 2008), 3 pgs.

Wikipedia, "Image Registration", http://en.wikipedia.org/wiki/Image_registration, (Oct. 19, 2008), 3 pgs.

Wikipedia, "Phase Correlation", http://en.wikipedia.org/wiki/Phase_correlation, (Oct. 19, 2008), 3 pgs.

Heysse, et al., "Field Tests of an Acoustic Logging-While-Drilling Tool in Various Borehole Environments", SPWLA 37th Annual Logging Symposium, 06/16-19/96, pp. 1-11.

The American Heritage Dictionary, Definition of Code, Third Edition, defined on p. 366 (3D ED. 1992) (Definition No. 4), 3 pgs.

Willis, et al., "Automatic P and S Velocity Determination from Full Waveform Digital Acoustic Logs", Geophysics, V48 n12, Dec. 1983, pp. 1631-1644.

* cited by examiner

AUTOMATED LEG QUALITY MONITORING SYSTEMS AND METHODS

BACKGROUND

Modern oil field operations demand a great quantity of information relating to the parameters and conditions encountered downhole. Such information typically includes characteristics of the earth formations traversed by the borehole, and data relating to the size and configuration of the borehole itself. The collection of information relating to conditions downhole, which commonly is referred to as "logging," can be performed by several methods including wireline logging and "logging while drilling" (LWD).

In wireline logging, a probe or "sonde" is lowered into the borehole after some or the entire well has been drilled. The sonde hangs at the end of a long cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole.

In LWD, the drilling assembly includes sensing instruments that measure various parameters as the formation is being penetrated. While LWD techniques allow more contemporaneous formation measurements, drilling operations create an environment that is generally hostile to electronic instrumentation and sensor operations.

In these and other logging environments, it is desirable to construct an image of the borehole wall. Among other things, such images reveal the fine-scale structure of the penetrated formations. The fine-scale structure includes stratifications such as shale/sand sequences, fractures, and non-homogeneities caused by irregular cementation and variations in pore size. Orientations of fractures and strata can also be identified, enabling more accurate reservoir flow modeling.

Borehole wall imaging can be accomplished in a number of ways, including ultrasonic imaging, micro-resistivity imaging, or azimuthally-sensitive varieties of laterologs, induction logs, nuclear magnetic resonance logs, gamma-ray logs, and other azimuthally-sensitive logs. In many cases, the image logs may appear accurate while failing to reflect the actual properties of the borehole wall. Such errors can result from erratic tool motion or poor wall contact during the logging process. Conversely, image logs may appear "noisy" (a symptom of erratic tool motion or poor wall contact) when in fact they accurately reflect the actual properties of the borehole wall. In the past, log quality judgments have been performed by experts using a subjective, error-prone approach.

BRIEF DESCRIPTION OF THE DRAWINGS

In the following detailed description, reference will be made to the accompanying drawings, in which.

The drawings show illustrative invention embodiments that will be described in detail. However, the description and accompanying drawings are not intended to limit the invention to the illustrative embodiments, but to the contrary, the intention is to disclose and protect all modifications, equivalents, and alternatives falling within the spirit and scope of the appended claims.

NOMENCLATURE

Certain terms are used throughout the following description and claims to refer to particular system components. This document does not intend to distinguish between components that differ in name but not function. The terms "including" and "comprising" are used in an open-ended fashion, and thus should be interpreted to mean "including, but not limited to . . . ". The term "couple" or "couples" is intended to mean either an indirect or direct electrical, mechanical, or thermal connection. Thus, if a first device couples to a second device, that connection may be through a direct connection, or through an indirect connection via other devices and connections. Conversely, the term "connected" when unqualified should be interpreted to mean a direct connection. For an electrical connection, this term means that two elements are attached via an electrical path having essentially zero impedance.

DETAILED DESCRIPTION

Disclosed herein are systems and methods for performing automated log quality monitoring, thereby enabling a fast, on-site determination of log quality by logging engineers. In addition, off-site log interpreters can obtain quick re-assurance of log quality, thereby recognizing the actuality of geologically-improbable features in the logs. Such uses of the disclosed systems and methods may be expected to provide early detection of logging issues, increase confidence in acquired logs, reduce unnecessary duplication of effort, and improve the reputation of the logging company.

In at least some embodiments, a disclosed automated log quality monitoring system includes at least one processor and a memory coupled to the processor to provide log monitoring software that generates and displays a log quality indicator for a user. The software may determine log quality indicator based on a quality measure that is applied measurements from axially-spaced (and/or azimuthally-spaced) sensors. The quality measure can be, inter alia, cross-correlation, mutual information, mean-square error, and ratio image uniformity, each of which can be determined as a function of a sliding window position to indicate regions wherein the log quality falls below a threshold value. It is not necessary for the log sensors to be of the same type, e.g., resistivity image sensors.

Figures 1, 2:
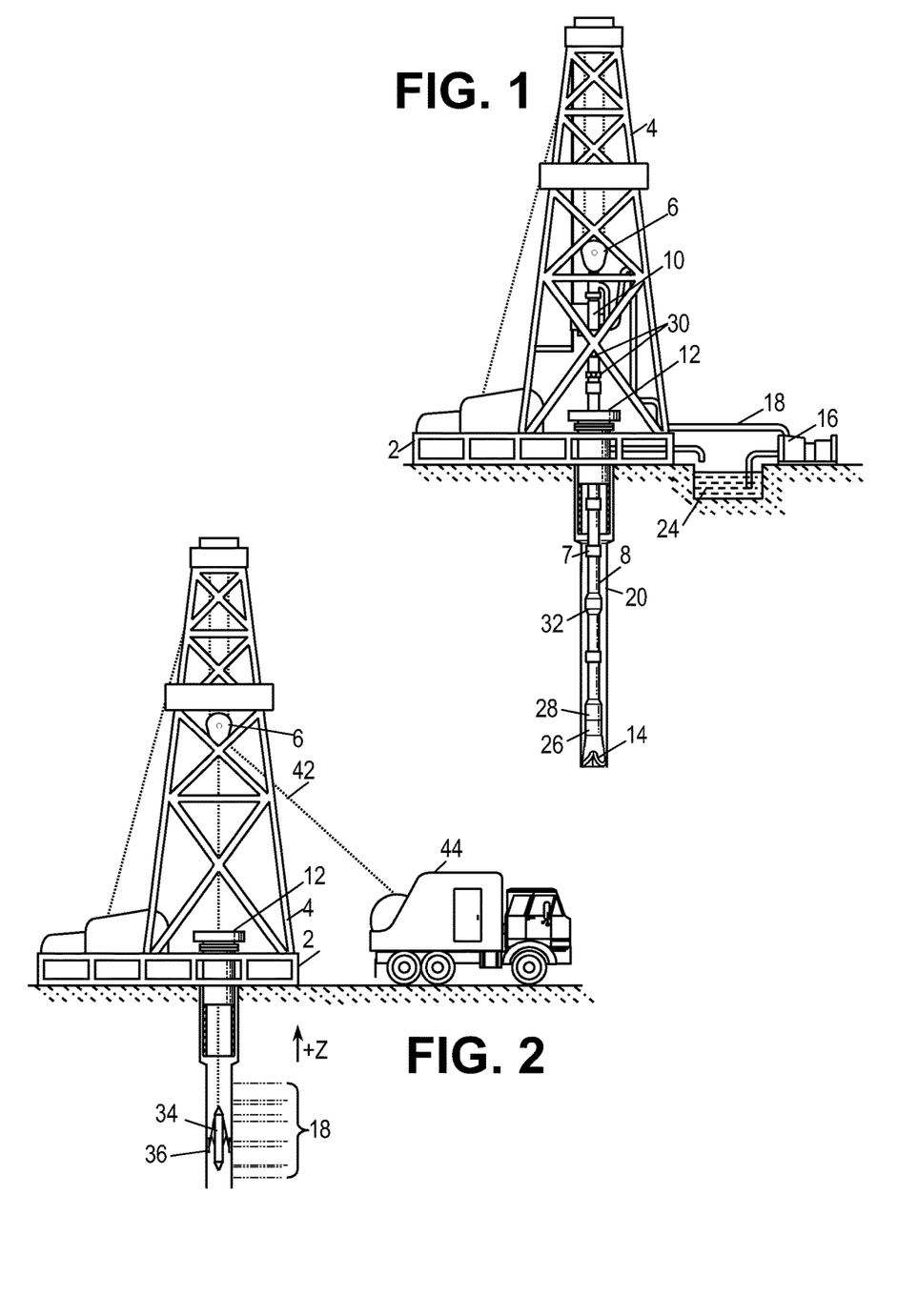
FIG. 1 shows an illustrative logging while drilling (LWD) environment.
FIG. 2 shows an illustrative wireline logging environment.

The disclosed systems and methods are best understood in the context of the larger environment in which they operate. Accordingly, FIG. 1 shows an illustrative logging while drilling (LWD) environment. A drilling platform 2 supports a derrick 4 having a traveling block 6 for raising and lowering a drill string 8. A drill string kelly 10 supports the rest of the drill string 8 as it is lowered through a rotary table 12. The rotary table 12 rotates the drill string, thereby turning a drill bit 14. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

The drill bit 14 is just one piece of a bottom-hole assembly that includes one or more drill collars (thick-walled steel pipe) to provide weight and rigidity to aid the drilling process. Some of these drill collars include built-in logging instruments to gather measurements of various drilling parameters such as position, orientation, weight-on-bit, borehole diameter, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

A LWD resistivity imaging tool 26 may integrated into the bottom-hole assembly near the bit 14. As the bit extends the borehole through the formations, tool 26 rotates and collects azimuthally-sensitive resistivity measurements that a downhole controller associates with tool position and orientation measurements to form a resistivity image map of the borehole wall. The measurements can be stored in internal memory and/or communicated to the surface. A telemetry sub 28 may be included in the bottom-hole assembly to maintain a communications link with the surface. Mud pulse telemetry is one common telemetry technique for transferring tool measurements to surface receivers 30 and receiving commands from the surface, but other telemetry techniques can also be used.

In some systems the LWD sensors collect and process logging data at a rate that is higher than the telemetry sub's communication rate. Such systems store the logging data in internal memory, but it is desirable to communicate some indication of operability and/or progress to the surface. Accordingly, the bottom-hole assembly may generate and transmit a log quality indicator to the surface along with a compressed representation or a subset of the logging data. In this manner, operators can be promptly alerted to log quality issues and react accordingly, e.g., by adjusting drilling parameters (rotation rate, weight on bit, drilling fluid flow, etc.) and/or transmitting commands to adjust logging parameters (sampling rates, transmit energy/frequency, filter selection, etc.).

At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable 42 having conductors for transporting power to the tool and telemetry from the tool to the surface. A resistivity imaging portion of the logging tool 34 may have sensing pads 36 that slide along the borehole wall as the tool is pulled uphole. A logging facility 44 collects measurements from the logging tool 34, and includes computing facilities for processing and storing the measurements gathered by the logging tool.

Figure 3:
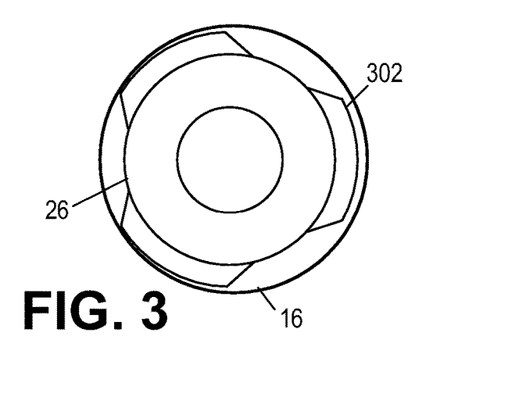
FIG. 3 is a cross-section of an illustrative logging tool.

FIG. 3 shows a cross-sectional view of an illustrative LWD resistivity imaging tool 26 in a borehole 16. Three stabilizers 302 maintain the tool near the center of the borehole and, in so doing, minimize the standoff between the external faces of the stabilizers and the borehole wall. It is desirable to minimize the thickness of the fluid layer between the sensing surface and the portions of the wall being measured. Other mechanisms can be employed to minimize standoff, such as pads mounted on extendable arms or biasing springs. Alternatively, such arms or springs may be used to force the tool body itself against the borehole wall. Though suitable for this application, such mechanisms may not be as robust as a sensing surface embedded in a stabilizer.

As the tool 26 rotates and progresses downhole at the drilling rate, each sensing surface will trace a helical path on the borehole wall. Orientation sensors within the tool can be used to associate the resistivity measurements with the sensors' positions on the borehole wall. Electronics within the tool can aggregate measurements of resistivity versus position to form a detailed resistivity image of the borehole wall, which can be stored for later retrieval or compressed and transmitted to the surface for timely use by the drilling team. If sufficient telemetry bandwidth is available, surface computing facilities can collect resistivity measurements, orientation (azimuth) measurements, and tool position measurements, and process the collected measurements to create and display the resistivity image.

Figure 4:
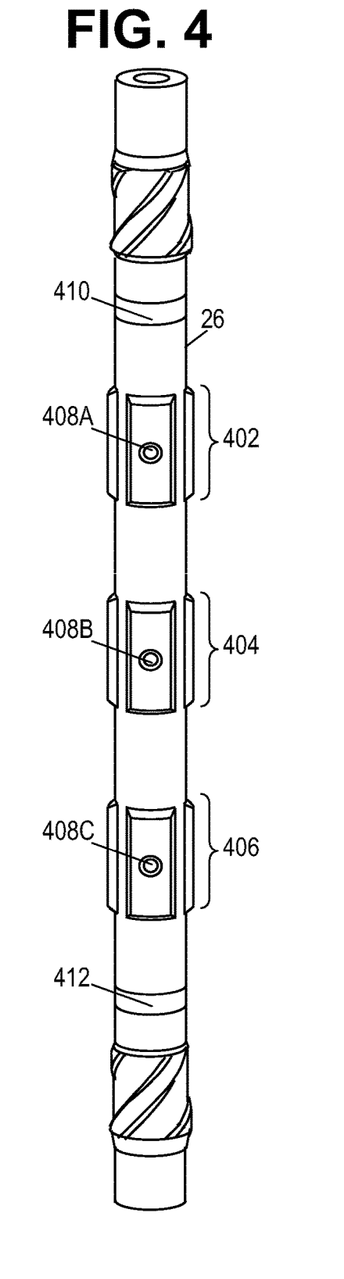
FIG. 4 is a perspective view of an illustrative logging tool.

FIG. 4 shows a perspective view of illustrative resistivity imaging tool 26. Tool 26 is a drill collar (a thick-walled steel tubular) having a set 402 of two or more azimuthally-spaced stabilizer protrusions 302 that act to minimize the standoff between the tool's sensing surface(s) and the borehole wall. The illustrative tool 26 includes three axially-spaced stabiliser sets 402, 404, 406, with each set including three azimuthally-spaced stabilizers. Each stabilizer includes a measurement electrode 408, for a total of nine measurement electrodes. As shown, each measurement electrode is positioned on the wall-contacting surface of the stabilizer. In the illustrative implementation, the measurement electrode is about one inch (2.5 cm) in diameter. The width of the insulating gaps around the electrode is no more than 0.2 inches (0.5 cm).

Toroids 410 and 412 each alternate between driving and sensing configurations. In the driving configuration, one of the toroids induces an axial electrical field or current flow. Resistivity-dependent currents escape each of the measurement electrodes and return via the string on the opposite side of the driving toroid. The electrode currents provide azimuthally-sensitive resistivity measurements, while the residual current passing through the other toroid enables a measurement of formation resistivity at the bit. The axial spacing of the electrodes enables resistivity measurements at different depths of investigation, while the alternation of the toroids enables compensated resistivity measurements to be calculated. Due to tool rotation at a rate much greater than the drill bit's rate of penetration, it is expected that one sensing surface at each axial position would be sufficient for compensated resistivity imaging at multiple depths of investigation However, additional sensing surfaces are provided on the other stabilizers for redundancy, and noise reduction. Such additional sensing surfaces enable the tool to function normally even if one of the surfaces is damaged. Moreover, the measurements from such additional surfaces enable the use of signal processing techniques that compensate for noise and individual variation of the sensing surfaces' performance characteristics.

Figure 5:
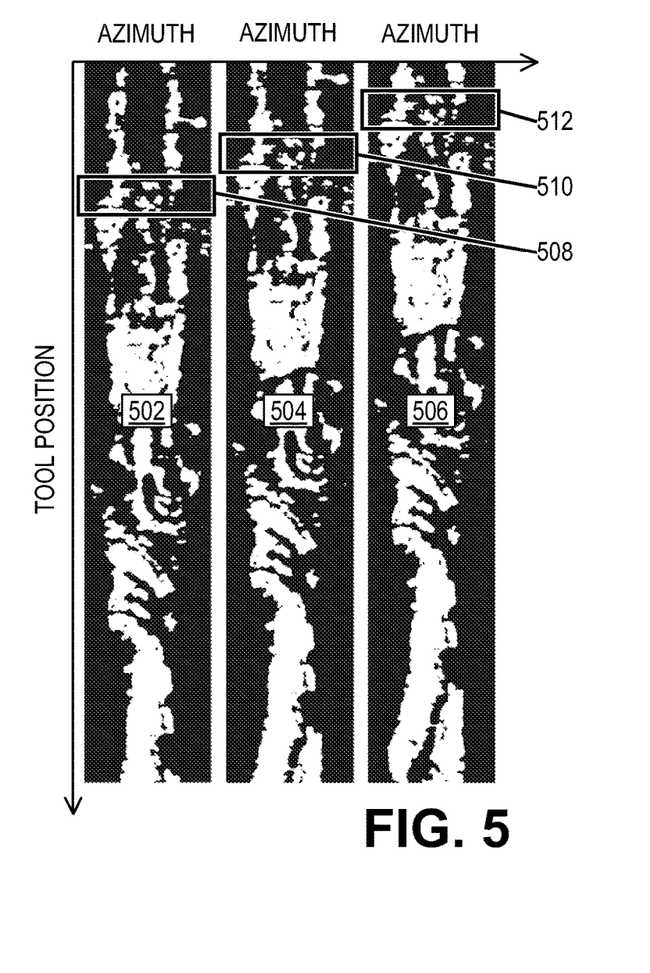
FIG. 5 shows illustrative logs gathered by different logging tool sensors.

When the formation resistivity measurements from a given electrode are associated with tool position and azimuthal orientation, they form a resistivity image such as those shown in FIG. 5. The surface of the borehole wall is divided into "bins", with each bin representing a pair of tool position and azimuthal orientation values. Each time the electrode passes a bin, it gathers one or more measurements that can be combined with previous measurements for that bin. The combined measurements yield a resistivity estimate that can be displayed as a pixel color and/or a pixel intensity. Such an image often reveals bedding structures and fractures. The uncompensated measurements from the nine different electrodes in response to the two different toroids can be processed to yield eighteen different resistivity images. FIG. 5 shows just three illustrative images 502, 504, 506, which correspond to the measurements of electrodes 408A, 408B, and 408C in response to driving toroid 410. These images are axially offset, as can be seen by comparing regions 508, 510, and 512. Stated in another way, each borehole wall bin is independently measured by each of the electrodes at different times. This redundancy can be exploited to provide an indication of log quality to log analysts.

Figure 6:
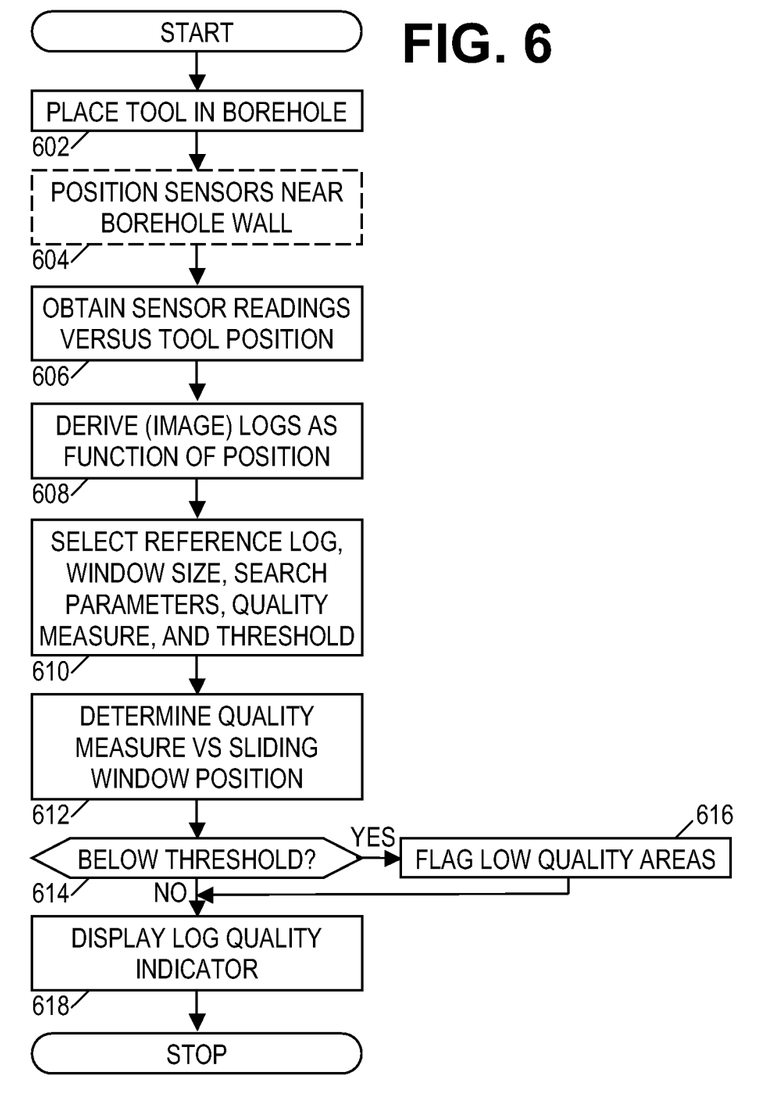
FIG. 6 is a flow diagram of an illustrative automated log quality monitoring method.

FIG. 6 is a flow diagram of an illustrative automated log quality monitoring method. Though shown and described in a sequential fashion, the various illustrated operations may occur concurrently or in a different sequence. Starting in block 602, the resistivity imaging tool is placed in a borehole. For LWD, the tool is part of the bottom hole assembly and is used to perform logging as drilling operations are performed. For wireline logging, the tool is part of a sonde that is lowered to the bottom of the region of interest to perform logging as the logging tool is pulled uphole at a steady rate. If needed, the sensing surfaces are deployed in block 604. For example, if the sensing surfaces are mounted on pads, those pads may be extended to contact the borehole wall.

In block 606, the tool obtains sensor readings as a position of tool position and orientation. For the tool configuration of FIG. 4, these sensor readings include current flow via the measurement electrodes in response to a driving toroid. The tool employs at least two axially-spaced sensors to obtain independent logs, but it should be noted that the sensors need not be resistivity sensors, nor do they need to be sensors of the same type. For example, an acoustic sensor and a pulsed neutron sensor could be employed. Other sensing technologies and tool combinations are well within the scope of this disclosure.

In block 608, the tool and/or the surface computing facility derives at least two logs from the sensor measurements as a function of tool position. (The operations represented by blocks 608-616 can be performed by the downhole tool, by on-site computing facilities, by off-site computing facilities, or by some combination thereof.) The disclosed systems and methods are particularly suitable for use with image logs, but they can also be applied to logs that only depend on tool position. Reference will be made to the image logs of FIG. 5 in the ensuing description.

In block 610, one of the logs is selected as a reference log. The reference log selection is not expected to be particularly crucial to the success of the method, but in many cases, one of the logs may be expected to be more suitable for use as a reference against which the other logs are compared. For example, the tool of FIG. 4 provides resistivity logs at different depths of investigation, and it may be expected that the log for an intermediate depth would be more suitable for use as a reference than the logs at the shallowest or deepest depth.

Also selected in block 610 is a window size. For reasons that will become clear, a comparison of the full logs would be insensitive to small regions of quality loss, whereas a comparison of unduly small areas would be overly sensitive to measurement noise. Because the various azimuthal measurements at a given tool position are taken in close time proximity, they may not be regarded as sufficiently independent for the purposes of quality monitoring. Thus the recommended window width covers the full 360° of borehole azimuth. The recommended window length may be set equal to the minimum axial spacing between sensors, as this is the minimum distance that the tool moves to provide some degree of measurement redundancy.

Further selected in block 610 are search parameters, which may include a range of position and orientation offsets to be used when searching for the best "fit" between logs. Such search parameters enable the method to compensate for imperfections in the determinations of tool depth and orientation. Also selected in block 610 are a quality measure and a threshold for judging log quality. The selections performed in block 610 can be predetermined using default values. Alternatively, a user can interact with the system to specify one or more of the foregoing selections.

Illustrative quality measures include cross-correlation, mutual information, mean-square error, and ratio image uniformity. When searching for the offset that offers the best fit, an image registration technique may be used, such as those phase correlation methods described in U.S. Pat. No. 6,373,970 (Dong et al.) and wikipedia.org, "Phase Correlation", each of which is hereby incorporated herein by reference. Phase correlation techniques offer simultaneous determination of the offset and the maximum cross-correlation. Other suitable image registration techniques are described in Lisa G. Brown, "A Survey of Image Registration Techniques", ACM Computing Surveys (CSUR), v. 24 n. 4, p. 325-376, December 1992, which is also hereby incorporated herein by reference. The threshold depends strongly on the logs and the quality measure, but a cross-correlation measure between two resistivity image logs is expected to indicate poor log quality when the measure falls below 0.6.

In block 612, the tool and/or surface computing facility compares the reference log to each of the other logs to determine the log quality as a function of sliding window position. In FIG. 5, log 504 may be chosen as the reference log, and the other logs compared to it. Regions 508 and 510 represent illustrative offset window locations for calculating the quality measure, e.g., a cross-correlation, for log 502 at the position of window 508. A similar quality measure is calculated for log 506.

Figure 7:
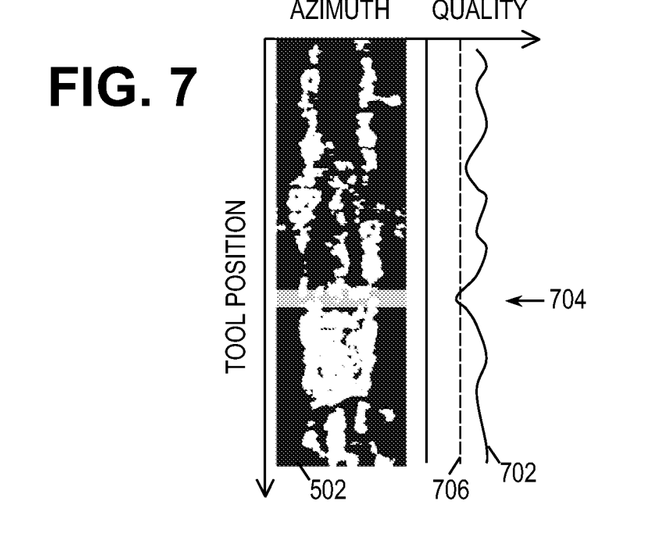
FIG. 7 shows an illustrative log with illustrative log quality indicators.

In block 614, the log quality is compared to the threshold, and if it falls below the threshold, the low quality region is flagged or somehow indicated in block 616. In block 618, a log quality indicator is displayed to a user, preferably together with one of the logs or an image generated from the logs. FIG. 7 shows an illustrative log 502 with an adjacent log quality graph 702. The arrow 704 indicates a low quality region where the log quality graph drops below the threshold value 706. The graph 702 itself may serve as the log quality indicator. Alternatively, or in addition, the low-quality regions of the log may be colorized (e.g., tinted red), displayed with reduced intensity, or otherwise distinguished to indicate their status as low-quality regions. Such measures are desirable because the poor quality arising from erratic tool motion or other causes may not be evident from the logs themselves.

Figures 8, 9:
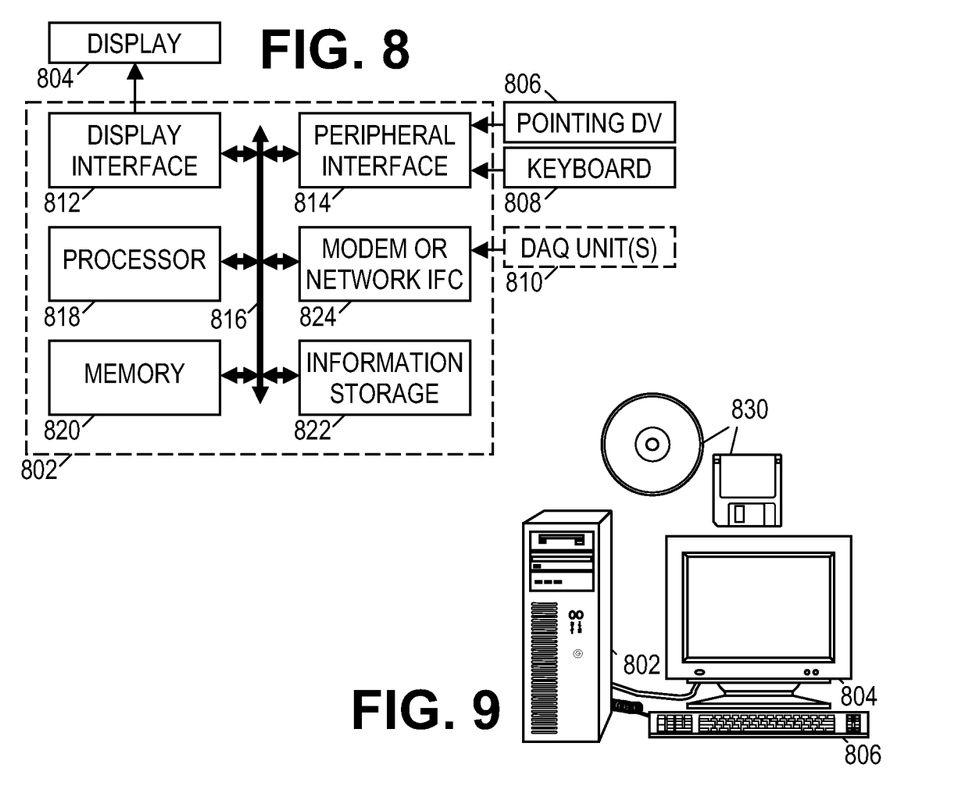
FIG. 8 is a block diagram of an illustrative log quality monitoring system.
FIG. 9 is a perspective view of an illustrative log quality monitoring system.

FIG. 8 is a block diagram of an illustrative log quality monitoring system, adapted to a computerized implementation. The system of FIG. 8 includes a chassis 802, a display 804, one or more input devices 806, 808, and may further include an optional data acquisition unit 810 to capture telemetry data from a logging tool. The chassis 802 is coupled to the display 804 and the input devices 806, 808 to interact with a user. The display 804 and the input devices 806, 808 together operate as a user interface. The display 804 often takes the form of a video monitor, whereas the input devices 806, 808 often take the form of a keyboard and pointing device.

Located in the chassis 802 is a display interface 812, a peripheral interface 814, a bus 816, a processor 818, a memory 820, an information storage device 822, and a network interface 824. The display interface 812 may take the form of a video card or other suitable interface that accepts information from the bus 816 and transforms it into a form suitable for display 804. Conversely, the peripheral interface 814 may accept signals from input devices 806, 808 and transform them into a form suitable for communication on bus 816. Bus 816 interconnects the various elements of the computer and transports their communications.

Processor 818 gathers information from the other system elements, including input data from the peripheral interface 814 and program instructions and other data from the memory 820, the information storage device 812, or from a remote location via the network interface 824. (The network interface 824 enables the processor 818 to communicate with remote systems via a wired or wireless network.) The processor 818 carries out the program instructions and processes the data accordingly. The program instructions may further configure the processor 818 to send data to other system elements, including information for the user, which may be communicated via the display interface 812 and the display 804.

The processor 818, and hence the computer as a whole, generally operates in accordance with one or more programs stored on an information storage device 822. One or more of the information storage devices may store programs and data on removable storage media such as a floppy disk or an optical disc 830 (FIG. 9). Whether or not the information storage media is removable, the processor 818 may copy portions of the programs into the memory 820 for faster access, and may switch between programs or carry out additional programs in response to user actuation of the input device. The additional programs may be retrieved from information the storage device 822 or may be retrieved from remote locations via the network interface 824. One or more of these programs configures the computer to carry out at least one of the log quality monitoring methods disclosed herein.

Stated in another fashion, the methods described herein can be implemented in the form of software that can be communicated to a computer or another processing system on an information storage medium such as an optical disk, a magnetic disk, a flash memory, or other persistent storage device. Alternatively, such software may be communicated to the computer or processing system via a network or other information transport medium. The software may be provided in various forms, including interpretable "source code" form and executable "compiled" form. The various operations carried out by the software may be written as individual functional modules (e.g., "objects", functions, or subroutines) within the source code.

FIG. 9 is a perspective view of an illustrative log quality monitoring system to more clearly demonstrate the components of the user interface. The chassis 802 is coupled to a display 804, and one or more input devices 806. Illustrative removable information storage media 830 are also shown. The display 804 and the input devices 806 cooperate to function as a user interface to enable the user to view logs with indicators of log quality.

In alternative system embodiments, the log quality monitoring functionality is built into a downhole logging tool or a bottom-hole assembly controller. Such system embodiments enable the log quality indicator values to be generated downhole and transmitted to the surface to alert operators to logging quality issues. Thus, even in systems have extremely limited telemetry bandwidth, operators can act promptly to address LWD issues during the drilling process.

While illustrative embodiments of this invention have been shown and described, modifications thereof can be made by one skilled in the art without departing from the spirit or teaching of this invention. The embodiments described herein are illustrative and are not limiting. Many variations and modifications of the system and apparatus are possible and are within the scope of the invention. For example, though the disclosure and claims use the term "resistivity", it is widely recognized that conductivity (the inverse of resistivity) has a one-to-one correspondence with resistivity and, consequently, usually serves as a functional equivalent to resistivity. Further, log comparisons between axially-aligned but azimuthally-spaced sensors may be useful for detecting certain types of logging errors. As another variation, the log quality indicator may be designed to indicate regions of high quality rather than regions of low quality. Accordingly, the scope of protection is not limited to the embodiments described herein, but is only limited by the claims which follow, the scope of which shall include all equivalents of the subject matter of the claims.

What is claimed is:

1. A log quality monitoring system that comprises:
   wellbore logging tool comprising:
     a first toroid disposed on a the wellbore logging tool;
     a second toroid disposed on the wellbore logging tool;
     a first set of two or more azimuthally-spaced stabilizer protrusions wherein a first set of measurement electrodes are disposed on the first set of two or more azimuthally-spaced stabilizer protrusions; and
     a second set of two or more azimuthally-spaced stabilizer protrusions wherein a second set of measurement electrodes are disposed on the second set of two or more azimuthally-spaced stabilizer protrusions and wherein the second set of azimuthally-spaced stabilizer protrusions are axially displaced from the first set of azimuthally-spaced stabilizer protrusions,
     wherein the first and second set of azimuthally-spaced stabilizer protrusions are disposed on an outer surface of the logging tool between the first toroid and the second toroid;
   at least one processor; and
   a memory coupled to the processor to provide log monitoring software that configures the processor to:
     apply a comparison function to measurements from spaced-apart sensors to determine an image log quality indicator for one or more image logs, the one or more image logs being images of a borehole wall that indicate bedding structures and/or fractures; and display at least one of the image logs wherein the image log quality indicator is a modification applied to regions of the image log where the log quality is determined to be below a threshold value, wherein the modification is a change in image color or a change in image intensity.

2. The system of claim 1, wherein the applying the comparison function comprises applying a comparison function to a reference image log and one or more additional image logs.

3. The system of claim 1, wherein the processor determines log quality as a function of a sliding window position, and formulates the image log quality indicator based on a comparison of the log quality to a threshold value.

4. The system of claim 1, wherein the image log quality indicator is a graph of log quality as a function of tool position.

5. The system of claim 1, wherein the spaced-part sensors measure borehole wall resistivity.

6. A log quality monitoring system that comprises:
a wellbore logging tool comprising:
  a first toroid disposed on the wellbore logging tool;
  a second toroid disposed on the wellbore logging tool;
  a first set of two or more azimuthally-spaced stabilizer protrusions wherein a first set of measurement electrodes are disposed on the first set of two or more azimuthally-spaced stabilizer protrusions; and
  a second set of two or more azimuthally-spaced stabilizer protrusions wherein a second set of measurement electrodes are disposed on the second set of two or more azimuthally-spaced stabilizer protrusions and wherein the second set of azimuthally-spaced stabilizer protrusions are axially displaced from the first set of azimuthally-spaced stabilizer protrusions,
  wherein the first and second set of azimuthally-spaced stabilizer protrusions are disposed on an outer surface of the logging tool between the first toroid and the second toroid,
  and wherein the first toroid and second toroid are configured to pass a current through a wellbore wall adjacent to the logging tool to the first set of measurement electrodes to generate a first signal and pass the current through the wellbore wall adjacent to the logging tool to the second set of measurement electrodes to generate a second signal;
at least one processor; and
a memory coupled to the processor to provide log monitoring software that configures the processor to:
  generate a first well log based on the first signal and a second well log based on the second signal;
  select a first area of the first well log, the first area corresponding to a logged position in the wellbore;
  select a second area of the second well log, the second area corresponding to the logged position in the wellbore;
  apply a comparison function to the first area and the second area to generate an image log quality indicator, wherein the step of applying the comparison function comprises:
    selecting a threshold value;
    applying the comparison function to the first area and the second area wherein the comparison function is selected from the group consisting of cross-correlation, mutual information, mean-square error, and ratio image uniformity; and
    comparing a result from the comparison function to the threshold to generate a log quality indicator; and
  display the first well log or the second well log and the log quality indicator, wherein the log quality indicator is a modification applied to regions of first well log or the second well log where the first well log or the second well log are determined to be below the threshold value, wherein the modification is a change in image color, change in image intensity, or both.

7. The system of claim 6, wherein the processor determines log quality as a function of a sliding window position, and formulates the image log quality indicator based on a comparison of the log quality to a threshold value.

8. The system of claim 6, further comprising displaying an image log quality indicator wherein the image log quality indicator is a graph of log quality as a function of wellbore logging tool position.

9. The system of claim 6 wherein the well logging tool is part of a drill collar or a wireline tool string.

10. A log quality monitoring method that comprises:
inserting into a wellbore a wellbore logging tool comprising:
  a first toroid disposed on a the wellbore logging tool;
  a second toroid disposed on the wellbore logging tool;
  a first set of two or more azimuthally-spaced stabilizer protrusions wherein a first set of measurement electrodes are disposed on the first set of two or more azimuthally-spaced stabilizer protrusions; and
  a second set of two or more azimuthally-spaced stabilizer protrusions wherein a second set of measurement electrodes are disposed on the second set of two or more azimuthally-spaced stabilizer protrusions and wherein the second set of azimuthally-spaced stabilizer protrusions are axially displaced from the first set of azimuthally-spaced stabilizer protrusions,
  wherein the first and second set of azimuthally-spaced stabilizer protrusions are disposed on an outer surface of the logging tool between the first toroid and the second toroid;
passing a current from the first toroid, second toroid, or both, through a wellbore wall adjacent to the logging tool to the first set of measurement electrodes to generate a first signal and pass the current through the wellbore wall adjacent to the logging tool to the second set of measurement electrodes to generate a second signal;
generating a first well log based on the first signal and a second well log based on the second signal;
selecting a first area of the first well log, the first area corresponding to a logged position in the wellbore;
selecting a second area of the second well log, the second area corresponding to the logged position in the wellbore;
applying a comparison function to the first area and the second area generate an image log quality indicator at the logged position, wherein the step of applying a comparison function comprises:
  selecting a threshold value;
  applying the comparison function to the first area and the second area wherein the comparison function is selected from the group consisting of cross-correlation, mutual information, and mean-square error; and comparing a result from the comparison function to the threshold to generate the image log quality indicator; and displaying an image log to a user, the image log comprising the first well log or the second well log and the image log quality indicator, wherein the log quality indicator is displayed as a change applied to pixels representing regions where the first well log or the second well log is below the threshold value.

* * * * *